United States Patent Office 3,247,256
Patented Apr. 19, 1966

3,247,256
BORON-CONTAINING COMPOUNDS
Marvin M. Fein, Westfield, N.J., and Carl W. Nebel, Wilmington, Del., assignors to Thiokol Chemical Corporation, Bristol, Pa.
No Drawing. Filed Mar. 28, 1963, Ser. No. 269,848
12 Claims. (Cl. 260—606.5)

The present invention relates to novel compounds containing boron and to methods for making the same.

In recent years, there has been considerable interest in boro-containing compounds because the high heat of combustion of these compounds adapts them for use as rocket fuels. According to the present invention, boron compounds have been prepared, which compounds are useful as intermediates in the preparation of boron-containing polymers useful as propellant binders. Moreover, the compounds of the present invention are themselves useful as high-energy fuels and as fuel additives. The solid products of this invention, either per se or after formation into a polymer, can be used as solid propellants for rocket power plants and other jet-propelled devices when mixed with suitable oxidizers such as ammonium, potassium, or sodium perchlorates, ammonium nitrate, etc. Such propellant mixtures are compounded by a number of techniques known to the art. For example, the mixtures may comprise from 5 to 35 parts by weight of boron-containing materials and from 65 to 95 parts by weight of solid oxidizing agents mixed therewith. In some cases the propellant may also by made by combining the boron compounds and oxidizers with a curable polymer, for example, of the polyethylene, polyurethane, polyester, or polyether types.

Other products of the invention may be used as additives in high-energy liquid fuels by mixing the products with combustible liquids such as compatible hydrocarbon fuels.

The boron-containing compounds of the invention may all be considered derivaties of carborane, which is a compound of carbon, hydrogen and boron, having the empirical formula $C_2H_{12}B_{10}$. Carborane is a solid material melting at 287–288° C. It is characterized by a surprisingly stable nuclear structure and two labile hydrogen atoms, one connected to each carbon atom. It may be conveniently represented by using the formula H$\theta$H. While there is some difference of opinion as to the molecular structure of carborane, its stability is usually attributed to a basket-shaped molecular configuration in which the ten boron atoms and two carbon atoms may be arranged at the apices of an icosahedron.

The method of the present invention comprises reacting a diacetylenic ether with a class of disubstituted carborane derivaties which are co-ordination compounds of sulfur, phosphorus, or nitrogen with decaborane:

$R_1C\equiv CR_2OR_3C\equiv CR_4$ + decabrone co-ordination compound $\rightarrow R_1\theta R_2OR_3OR_4$ wherein $R_2$ and $R_3$ are alkylene groups, suitably lower alkylene groups such as those having 1 to 4 carbon atoms, $R_1$ and $R_4$ are hydrogen or alkyl, suitably lower alkyl, and $\theta$ is $C_2H_{10}B_{10}$, i.e., of the formula

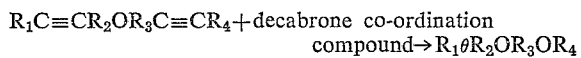

with the generalized, delocalized pi-bonding as indicated between the carbon and boron atoms.

The disubstituted carborane derivatives which are useful for the process of the present invention are co-ordination compounds of sulfur, phosphorus, or nitrogen with decarborane, $B_{10}H_{14}$. These co-ordination compounds are formed by the donation of electrons to the decabonrane by sulfur, nitrogen, or phosphours atoms. For example, the sulfur atom in di-ethyl sulfide, which as the following electronic configuration

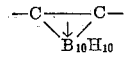

is capable of donating electrons to form a covalent bond, that is "co-ordination," with a chemical which is electronically disposed to accept such electrons. Decaborane, which loses its labile hydrogen atoms, is a suitable co-ordinating compound probably because the trivalent nature of boron readily allows it to accept electrons available in molecules of diethyl sulfide. Nitrogen, like sulfur, forms many compounds in which electrons are available for co-ordinating with other materials. These electron-donating compounds are known to those skilled in the art as Lewis bases. Other examples of such electron-donating materials are ammonia, primary and secondary amines, amides, nitriles, and cyanamides. Phosphorus compounds such as triphenyl phosphine are also useful in the formation of such co-ordination compounds.

The specific chemical employed in forming the co-ordination compound is not critical to the present invention because the co-ordination compound is merely a vehicle for reacting the co-ordinated decaborane with a diacetylenic ether. The electron-donating portion of the co-ordinated compound does not itself appear in the products of the invention. Because of this fact the compound may be chosen primarily for its convenience in handling and its ready availability.

Preferred among such compounds are diethyl sulfide and acetonitrile which form co-ordination compounds with decaborane by the following reactions:

$B_{10}H_{14} + 2(C_2H_5)_2S \rightarrow B_{10}H_{12}[(C_2H_5)_2S]_2 + H_2\uparrow$ $B_{10}H_{14} + 2CH_3CN \rightarrow B_{10}H_{12}(CH_3CN)_2 + H_2\uparrow$ Both of these reactions are suitably carried out in an inert solvent at room temperature. Hereafter in this application, these and similar co-ordination compounds shall be referred to as compounds in which decarborane is co-ordinated with electron-donating sulfur compounds and electron-donating nitrogen compounds.

Typical of the co-ordination compounds which result when the above-discussed electron-donating compounds are reacted with decaborane are bis alkyl nitrilo decaboranes, such as bisacetonitrilodecaborane, bis alkyl sulfido decaboranes such as bis diethylsulfidodecaborane, and bis alkylamidodecaboranes such as bis (dimethylacetamido) decaborane. The alkyl group in the aforementioned compounds are preferably chosen from among lower alkyls (i.e., 1–4 carbon atoms), but may also be any higher alkyl groups which permit solubility of the co-ordination compound in the solvent chosen as the medium for the reaction.

The diacetylenic ether may be symmetrical or asymmetrical. Ethers with straight alkyl chains are preferred over those with excessively branched chains because of the greater probability of steric hindrance of reaction with the latter materials. The molecular weight of the ether chosen is not critical and, for example, may be chosen with reference to the solubility of the ether in the organic solvent chosen as the medium for the reaction.

Suitable solvents for the reaction media are aliphatic, cycloaliphatic, and aromatic hydrocarbon and oxygenated materials and mixtures thereof, such as benzene, toluene, cyclohexane, hexane, heptane, dioxane, ethers, etc. The choice of solvent is not critical and will be determined by the solubility characteristics of the particular reactants being utilized.

In a preferred manner of carrying out the method of the present invention, one of the reactants is added to a solution of the other reactant in the chosen solvent. The sequence of solution is not critical and will largely be determined by convenience in handling the reactants.

The reaction between decaborane and the electron-donating compound proceeds suitably at room temperature but higher or lower temperatures may be used when convenient. Likewise, the reaction between the compound in which decaborane is co-ordinated with an electron-donating sulfur phosphorus or nitrogen compound and the acetylenic ether may be carried out suitably at room temperature. However, it is usually convenient to shorten the reaction time of this reaction by processing at a somewhat elevated temperature such as at the boiling temperature of the inert solvent medium. Of course, as is evident to one skilled in the art, the boiling temperature of the solvent medium employed may be below room temperature in some instances. In such a case, the reaction may be carried out at the lower temperature or, if desired, the reaction vessel may be pressurized to allow processing at a higher temperature while maintaining in low-boiling solvent in the liquid state.

It will also be readily understood by one skilled in the art that the above reactions may take place when the reactants are in the gaseous phase entirely or without the use of an inert solvent medium. However, in all cases, the reactants are suitably maintained in contact for a time permitting substantially complete reaction. The reaction time is not critical, and will vary with the reaction temperature, concentration, etc. as is usual in chemical reactions. The product is conveniently recovered, depending upon its solubility characteristics, by crystallization either by cooling of the mother liquor or by the addition of a quantity of a relatively poor solvent for the product.

In order to point out more fully the nature of the present invention, the following specific examples are given as illustrative embodiments of the present process and products produced thereby.

*Example I*

Two-tenths of a mole of bis(acetonitrilo)decaborane were mixed with one-tenth mole of di(3-butynyl)ether which had been dissolved in 200 ml. of toluene. The toluene was allowed to reflux for several hours during which time the following chemical reaction took place:

$$B_{10}H_{12}(CH_3CN)_2 + (CH \equiv CCH_2CH_2)_2O$$
$$\rightarrow (H\theta CH_2CH_2)_2O + 2CH_3CN + H_2\uparrow$$

wherein $\theta$ represents the group $C_2H_{10}B_{10}$.

Insoluble by-products formed during the reaction were removed by filtration. The filtrate was concentrated by vacuum stripping after which the concentrated filtrate was extracted, first with pentane, then with refluxing heptane. The extract was discarded and the filtrate was concentrated by further stripping. Finally, the crude product, bis(carboranyl-11 ethyl) ether, was crystallized out of the filtrate by addition of methanol to the filtrate.

The product was soluble in aromatic solvents and polar solvents such as acetonitrile. It was soluble to a lesser extent in hot alkanes. The melting point of the product was 117–118° C. Analysis of the product's infra-red spectrum, molecular weight as determined by its depression of the benzene freezing point, and atomic distribution confirmed the product to be bis(12-carboranyl ethyl) ether:

Analysis for $C_8H_{30}B_{20}O$:

|  | C | H | B |
|---|---|---|---|
| Calculated | 26.78 | 8.45 | 60.31 |
| Found | 26.45 | 8.31 | 59.61 |

*Example II*

A mixture of 500 ml. of dioxane and 500 ml. of toluene was prepared into which were dissolved 8.16 moles of decaborane. When ethyl sulfide was added to the solution, the following reaction took place:

$$B_{10}H_{14} + 2(C_2H_5)_2S \rightarrow B_{10}H_{12}[(C_2H_5)S]_2 + H_2\uparrow$$

The solution containing the bis(diethylsulfido)decaborane compound was heated to 65° C. and dipropargyl ether was added with agitation whereupon this reaction took place:

$$B_{10}H_{12}[(C_2H_5)_2S]_2 + (HC \equiv CCH_2)_2O$$
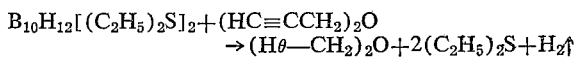
$$\rightarrow (H\theta-CH_2)_2O + 2(C_2H_5)_2S + H_2\uparrow$$

The product, bis(12-carboranylmethyl)ether, crystallized out of the reaction solution cooling to room temperature. The product was purified by crystallization from dioxane. The melting point of the purified product was 300° C. The atomic distribution and infra-red analysis were consistent with the proposed structure:

Analysis for $C_6H_{26}B_{20}O$:

|  | C | H | B |
|---|---|---|---|
| Calculated | 21.79 | 7.93 | 65.44 |
| Found | 21.01 | 8.02 | 64.26 |

It is of course to be understood that the foregoing examples are intended to be illustrative and that numerous changes can be made in the ingredients, proportions, and conditions set forth therein without departing from the spirit of the invention as defined in the appended claims.

We claim:

1. An organoborane compound of the formula $$R_1C_2H_{10}B_{10}R_2OR_3C_2H_{10}B_{10}R_4$$

wherein $R_1$ and $R_4$ are selected from the group consisting of hydrogen atoms and alkyl groups and $R_2$ and $R_3$ are alkylene groups.

2. An organoborane compound of the formula $$R_1C_2H_{10}B_{10}R_2OR_3C_2H_{10}B_{10}R_4$$

wherein $R_1$ and $R_4$ are slected from the group consisting of hydrogen atoms and lower alkyl groups and where $R_2$ and $R_3$ are lower alkylene groups.

3. An organoborane compound of the formula $$R_1C_2H_{10}B_{10}R_2OR_3C_2H_{10}B_{10}R_4$$

wherein $R_1$ and $R_4$ are hydrogen atoms and $R_2$ and $R_3$ are lower alkylene groups.

4. A product of the formula $$(HC_2H_{10}B_{10}CH_2)_2O$$

5. A product of the formula $$(HC_2H_{10}B_{10}CH_2CH_2)_2O$$

6. A process which comprises reacting compounds in which decaborane is co-ordinated with compounds selected from the group consisting of electron-donating sulfur compounds, electron-donating phosphorus compounds, and electron-donating nitrogen compounds, with diacetylenic ethers of the formula $$R_1C \equiv CR_2OR_3C \equiv CR_4$$

wherein $R_1$ and $R_4$ are selected from the group consisting of hydrogen atoms and alkyl groups, and $R_2$ and $R_3$ are alkyl groups, to form ethers in which two decaborane groups are incorporated.

7. A process as in claim 6 wherein $R_1$ and $R_4$ are both hydrogen atoms, and wherein $R_2$ and $R_3$ are lower alkylene groups.

8. A process comprising reacting bis(diethyl sulfido) decaborane with dipropargyl ether to form bis(12-carboranylmethyl)ether.

9. A process comprising reacting bis(acetonitrilo) decaborane with di-(3-butynyl)ether to form bis(12-carboranylethyl)ether.

10. A process which comprises reacting decaborane with a compound selected from the group consisting of electron-donating sulfur compounds, electron-donating phosphorus compounds, and electron-donating nitrogen compounds and reacting the resulting co-ordination compound with a di-acetylenic ether to form a bis(carboranylalkyl) ether.

11. A process which comprises reacting decaborane with ethyl sulfied to form a co-ordination compound, and reacting said co-ordination compound with dipropargyl ether to form a compound of the formula $$(HC_2H_{10}B_{10}CH_2)_2O$$

12. A process which comprises reacting decaborane with acetonitrile to form a co-ordination compound, and reacting said co-ordination compound with di-(3-butynyl) ether to form a compound of the formula $$(HC_2H_{10}B_{10}CH_2CH_2)_2O$$

No references cited.

TOBIAS E. LEVOW, *Primary Examiner.*

CARL D. QUARFORTH, REUBEN EPSTEIN,
*Examiners.*